United States Patent
Wang et al.

(10) Patent No.: US 12,236,307 B2
(45) Date of Patent: Feb. 25, 2025

(54) DISPLAY DEVICE, CONTROL METHOD THEREOF, AND COMPUTER STORAGE MEDIUM

(71) Applicants: Chengdu BOE Optoelectronics Technology Co., Ltd., Sichuan (CN); BOE Technology Group Co., Ltd., Beijing (CN)

(72) Inventors: Wei Wang, Beijing (CN); Xin Zhou, Beijing (CN); Shuo Li, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/017,056

(22) PCT Filed: Jan. 27, 2022

(86) PCT No.: PCT/CN2022/074376
§ 371 (c)(1),
(2) Date: Jan. 19, 2023

(87) PCT Pub. No.: WO2023/141893
PCT Pub. Date: Aug. 3, 2023

(65) Prior Publication Data
US 2024/0249087 A1    Jul. 25, 2024

(51) Int. Cl.
*G06K 7/016*    (2006.01)
*G06K 7/10*    (2006.01)
*H04B 1/036*    (2006.01)
*H04B 5/72*    (2024.01)

(52) U.S. Cl.
CPC ........ *G06K 7/016* (2013.01); *G06K 7/10336* (2013.01); *G06K 7/10386* (2013.01); *H04B 1/036* (2013.01); *H04B 5/72* (2024.01)

(58) Field of Classification Search
CPC .................. G06K 7/016; H04B 5/72
USPC ............................................ 235/474
See application file for complete search history.

(56) References Cited

U.S. PATENT DOCUMENTS

| | | | |
|---|---|---|---|
| 2012/0220219 A1* | 8/2012 | Hill ...................... | H04M 1/0283 455/41.1 |
| 2017/0045916 A1 | 2/2017 | Kim et al. | |
| 2019/0311680 A1* | 10/2019 | Koo .......................... | G06F 3/14 |

(Continued)

FOREIGN PATENT DOCUMENTS

| | | |
|---|---|---|
| CN | 106791187 A | 5/2017 |
| CN | 107925152 A | 4/2018 |
| CN | 108762544 A | 11/2018 |

(Continued)

*Primary Examiner* — Allyson N Trail
(74) *Attorney, Agent, or Firm* — IPro, PLLC

(57) ABSTRACT

Provided is a display device. The display device includes a control component, and the control component is configured to control a display component to operate; and control, in response to receiving a first control instruction, at least one of a near-field communication component and the display component such that a signal-sending period of the near-field communication component falls within an image-holding period of the display component, wherein the near-field communication component is configured to send a signal during the signal-sending period.

17 Claims, 5 Drawing Sheets

(56) References Cited

U.S. PATENT DOCUMENTS

2021/0067198 A1    3/2021  Tramoni
2021/0109363 A1*  4/2021  Lyubarsky ........... H04N 13/324

FOREIGN PATENT DOCUMENTS

| CN | 110364107 A | 10/2019 |
| CN | 112448738 A | 3/2021 |
| CN | 113691271 A | 11/2021 |

* cited by examiner

DISPLAY DEVICE, CONTROL METHOD THEREOF, AND COMPUTER STORAGE MEDIUM

CROSS-REFERENCE TO RELATED APPLICATION

This application is a U.S. national stage of international application No. PCT/CN2022/074376, filed on Jan. 27, 2022, which is incorporated herein by reference in its entirety.

TECHNICAL FIELD

The present disclosure relates to the technical field of displays, and in particular, relates to a display device, a control method thereof, and a computer storage medium.

BACKGROUND OF THE INVENTION

The display device has a display function. Typically, the display device further has a near-field communication function.

SUMMARY OF THE INVENTION

Embodiments of the present disclosure provide a display device, a control method thereof, and a non-transitory computer storage medium. The technical solutions are as follows.

According to some embodiments of the present disclosure, a display device is provided. The display device includes a control component, a near-field communication component, and a display component, wherein the near-field communication component and the display component are both electrically connected to the control component, and the control component is configured to:

control the display component to operate; and control, in response to receiving a first control instruction, at least one of the near-field communication component and the display component such that a signal-sending period of the near-field communication component falls within an image-holding period of the display component, wherein the near-field communication component is configured to send a signal during the signal-sending period.

In some embodiments, the control component is configured to:

send a first control signal to the near-field communication component and send a second control signal to the display component;

wherein the first control signal includes a target length of the signal-sending period, a target polling cycle, and a target position of the signal-sending period in each polling cycle, the target length being less than or equal to a length of the image-holding period of the display component operating at a target refresh cycle, the target polling cycle being an integer multiple of the target refresh cycle, and the target position being identical to a position of the image-holding period in one refresh cycle of the display component, and the second control signal instructs the display component to operate at the target refresh cycle.

In some embodiments, the display component includes a display substrate and a heat dissipation layer disposed on a back of the display substrate; and the near-field communication component includes a first controller and a coil, wherein the first controller is electrically connected to the coil and the coil is disposed in the heat dissipation layer.

In some embodiments, the heat dissipation layer includes a substrate and a metal layer disposed on the substrate, and the coil of the near-field communication component and the metal layer are of a same layer structure and disposed in a same layer.

In some embodiments, a distance between the coil and the metal layer ranges from 1 mm to 50 mm.

In some embodiments, the display component includes a display substrate, wherein the display substrate is provided with a data line; and the near-field communication component includes a first controller and a coil, wherein the first controller is electrically connected to the coil, and an orthographic projection of the coil onto a first surface is at least partially overlapped with an orthographic projection of the data line onto the first surface, the first surface being a surface where a light-emergent surface of the display substrate is disposed.

According to some embodiments of the present disclosure, a control method of a display device is provided. The method is applied in the display device including a near-field communication component and a display component. The method includes:

controlling the display component to operate; and controlling, in response to receiving a first control instruction, at least one of the near-field communication component and the display component such that a signal-sending period of the near-field communication component falls within an image-holding period of the display component, wherein the near-field communication component is configured to send a signal during the signal-sending period.

In some embodiments, the near-field communication component is configured to cycle into the signal-sending period and a monitoring period, wherein the controlling, in response to receiving the first control instruction, at least one of the near-field communication component and the display component such that the signal-sending period of the near-field communication component falls within the image-holding period of the display component includes:

sending, in response to receiving the first control instruction, a control signal to the at least one of the near-field communication component and the display component such that a polling cycle is an integer multiple of a refresh cycle of the display component and the signal-sending period falls within the image-holding period of the display component, wherein the polling cycle is a period during which the near-field communication component cycles into the signal-sending period and the monitoring period.

In some embodiments, the sending the control signal to the at least one of the near-field communication component and the display component includes.

sending a first control signal to the near-field communication component, wherein the first control signal includes a target length of the signal-sending period, a target polling cycle, and a target position of the signal-sending period in each polling cycle, the target length being less than or equal to a length of a current image-holding period of the display component, the target polling cycle being an integer multiple of a current refresh cycle of the display component, and the target position being identical to a position of the image-holding period in one refresh cycle of the display component.

In some embodiments, the sending the control signal to the at least one of the near-field communication component and the display component includes:

sending a second control signal to the display component, wherein the second control signal instructs the display component to operate at a target refresh cycle such that the signal-sending period falls within the image-holding period of the display component.

In some embodiments, the sending the control signal to the at least one of the near-field communication component and the display component includes:

sending a first control signal to the near-field communication component and sending a second control signal to the display component;
wherein the first control signal includes a target length of the signal-sending period, a target polling cycle, and a target position of the signal-sending period in each polling cycle, the target length being less than or equal to a length of the image-holding period of the display component operating at a target refresh cycle, the target polling cycle being an integer multiple of the target refresh cycle, and the target position being identical to a position of the image-holding period in one refresh cycle of the display component, and the second control signal instructs the display component to operate at the target refresh cycle.

In some embodiments, the method further includes:
controlling, in response to receiving the second control instruction, the near-field communication component to stop entering the signal-sending period, and controlling the display component to operate at a first refresh cycle, wherein the first refresh cycle is less than the target refresh cycle.

In some embodiments, the first control instruction instructs the near-field communication component to enter a card reading mode, and the near-field communication component is configured to cycle into the signal-sending period and the monitoring period in the card reading mode.

In some embodiments, wherein upon controlling, in response to receiving the first control instruction, at least one of the near-field communication component and the display component such that the signal-sending period of the near-field communication component falls within the image-holding period of the display component, the method further includes:

controlling, in response to receiving card-removing information sent by the near-field communication component, the least one of the near-field communication component and the display component such that the signal-sending period of the near-field communication component falls within the image-holding period of the display component, wherein the card-removing information indicates that a card read by the near-field communication component has been removed.

According to some embodiments of the present disclosure, a display device is provided. The display device includes a processor and a memory storing at least one instruction, at least one program, a code set, or an instruction set therein. The processor, when loading and executing the at least one instruction, the at least one program, the code set, or the instruction set, is caused to perform the control method of the display device as described above.

According to some embodiments of the present disclosure, a non-transitory computer storage medium is provided.

The non-transitory computer storage medium stores at least one instruction, at least one program, a code set, or an instruction set therein. The at least one instruction, the at least one program, the code set, or the instruction set, when loaded and executed by a processor, causes the processor to perform the control method of the display device as described above.

According to some embodiments of the present disclosure, a computer program product or a computer program is provided. The computer program product or the computer program includes one or more computer instructions stored in a computer-readable storage medium. The one or more computer instructions, when loaded and executed by a processor of a computer device from the computer-readable storage medium, cause the computer device to perform the control method of the display device as described above.

BRIEF DESCRIPTION OF THE DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

For some specific embodiments of the present disclosure illustrated by the above drawings, the detailed description is given hereafter. Drawings and descriptions are not intended to limit the scope of the conception of the present disclosure, but only to illustrate the concept of the present disclosure for those skilled in the art by referring to the specific embodiments.

DETAILED DESCRIPTION

The present disclosure is described in further detail with reference to the enclosed drawings, to clearly present the objects, technical solutions, and advantages of the present disclosure.

A control method of a display device is applied in the display device including a display component and a near-field communication component. In the method, the display component is controlled to perform a display, and the near-field communication component is controlled to periodically send a signal for reading information of external cards. In this way, the near-field communication function is implemented along with the display function.

Near-field communication (NFC) is a short-range high-frequency wireless communication technology. Various functions such as a card reading function, an analog card function, and a point-to-point communication function are implemented through the near-field communication technology. The card reading function refers to the function of non-contact reading external cards. During the card reading function, the near-field communication component enters a card reading mode. In this mode, the near-field communication component cycles into a signal-sending period and a monitoring period. During the signal-sending period, the near-field communication component sends signals, and during the monitoring period, the near-field communication component monitors whether there is any feedback signal outside.

However, in the signal-sending period, a larger current is present in the near-field communication component when the near-field communication component sends the signal. The larger current adversely affects the display of the display component.

To be specific, the display component cycles into an image refresh period and an image-holding period at a certain refresh cycle during the display. In the image refresh period, a drive circuit in the display component controls a refresh of the image by an electrical signal. After the refresh of the image is completed, the display component enters the image-holding period and maintains the display of the refreshed image. In the case that the signal-sending period of the near-field communication component is overlapped with the image refresh period of the display component (such as being partially or completely overlapped), then the larger current in the near-field communication component causes a great impact on the drive circuit in the display component, such that the display component is incapable of refreshing the image normally, for example, problems such as image flicker occur.

Figure 1:
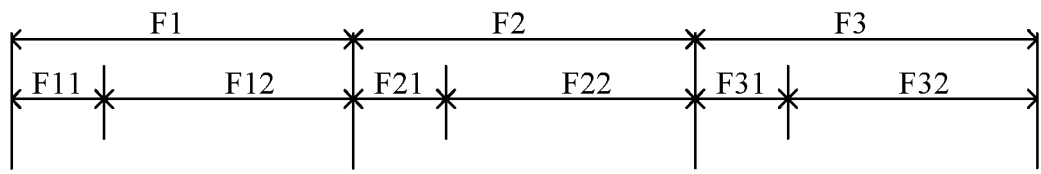
FIG. 1 is a schematic diagram of a refresh cycle of an image component.

The refresh cycle mentioned above indicates time spent by the display component to display a frame of an image. Accordingly, the display component displays a plurality of frames of images at a preset refresh rate, and the refresh cycle is reciprocal of the refresh rate. FIG. 1 is a schematic diagram of a refresh cycle of an image component. Referring to FIG. 1, it illustrates three consecutive refresh cycles F1, F2, and F3, and each of the refresh cycles includes the image refresh period and the image-holding period (e.g., an image refresh period F11 and an image-holding period F12 of the refresh cycle F1). Exemplarily, in the case that the refresh rate of the display component is 60 Hz (i.e., the refresh cycle is 1/60 seconds), then the display component displays 60 frames of image per second, and the time for displaying each frame of image is 1/60 seconds. Taking the refresh cycle F1 illustrated in FIG. 1 as an example, in the refresh cycle F1, the image is first refreshed in the image refresh period F11, and after the refresh of the image is completed, the image-holding period F12 is entered to maintain the display of the image. For example, the image refresh period F11 is the first 1/300 seconds in the 1/60 seconds, and the image-holding period F12 is the last 4/300 seconds in the 1/60 seconds.

Figure 2:
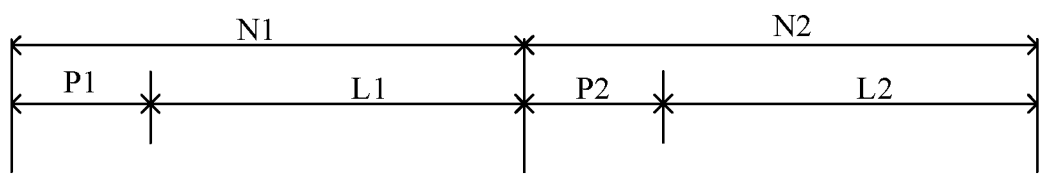
FIG. 2 is a schematic diagram of a card reading mode of a near-field communication component.

In addition, FIG. 2 is a schematic diagram of the card reading mode of the near-field communication component mentioned above. Referring to FIG. 2, FIG. 2 illustrates two consecutive polling cycles N1 and N2. Each of the polling cycles includes the signal-sending period and the monitoring period (e.g., the polling cycle N1 includes a signal-sending period P1 and a monitoring period L1). During the signal-sending period, the near-field communication component sends at least one polling signal, which includes, for example, a polling signal of NFC-A, a polling signal of NFC-B, a polling signal of NFC-F, and other polling signals, for which reference is made to the related art, which is not repeated herein. During the monitoring period, the near-field communication component can monitor whether there is a feedback signal to the polling signal outside. If there is a feedback signal, it indicates that the card has been read.

Referring to FIG. 1 and FIG. 2, in each polling cycle of the near-field communication component, if the signal-sending period of the near-field communication component does not completely fall into the image-holding period of the display component, then the signal-sending period is at least partially overlapped with the image refresh period, which will result in adversely affecting on the normal display of the display component. Based on this, the embodiments of the present disclosure provide a control method of a display device, a control component, and a display device, which is capable of solving the problem.

Figure 3:
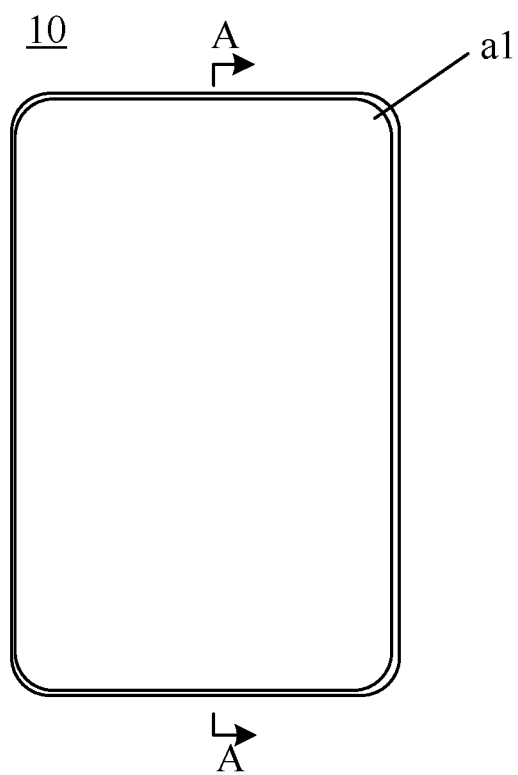
FIG. 3 is a structural schematic diagram of a display device according to some embodiments of the present disclosure.

FIG. 3 is a structural schematic diagram of a display device according to some embodiments of the present disclosure. Referring to FIG. 3, the display device 10 includes a light-emergent surface al, which performs a display of an image.

Figure 4:
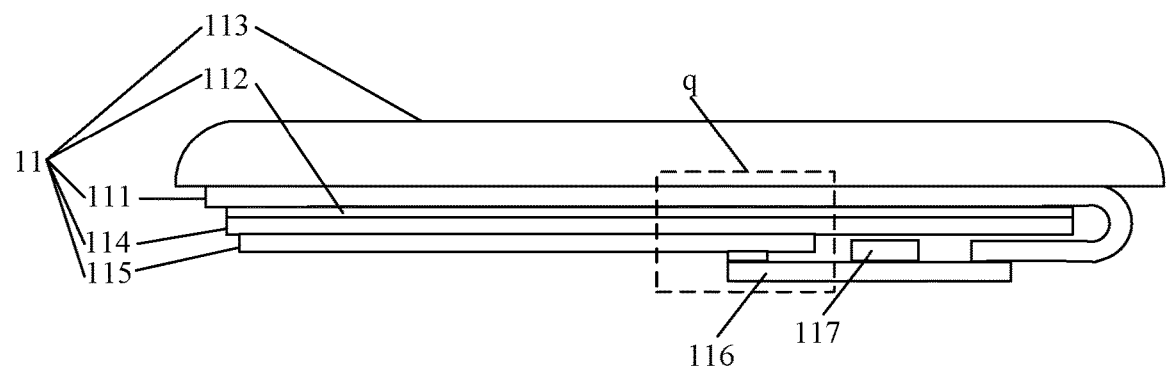
FIG. 4 is a sectional view of the display device illustrated in FIG. 3.
Figure 5:
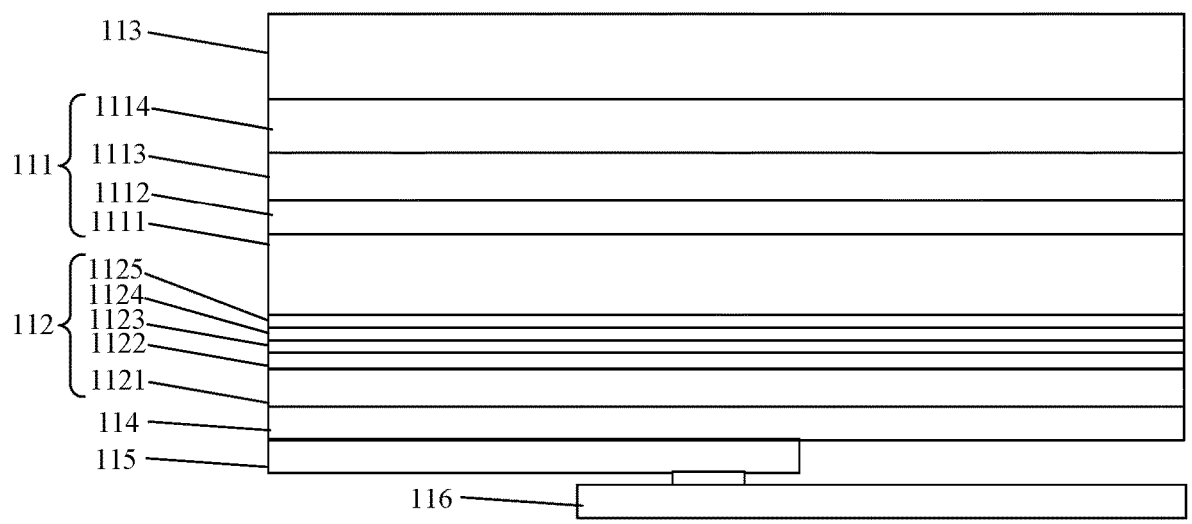
FIG. 5 is a partially enlarged diagram of the display device illustrated in FIG. 4.

FIG. 4 is a sectional view of the display device illustrated in FIG. 3 (the sectional position is an A-A line), and FIG. 5 is a partially enlarged diagram of the display device illustrated in FIG. 4 (the region q indicated by the dashed box).

Referring to FIG. 4 and FIG. 5, the display device includes a display component 11 and a near-field communication component.

The display component 11 includes a display substrate 111 and a heat dissipation layer 112 disposed on the back of the display substrate 111.

The near-field communication component includes a first controller (not illustrated in FIG. 4 and FIG. 5) and a coil (not illustrated in FIG. 4 and FIG. 5). The first controller is electrically connected to the coil, and the coil is disposed in the heat dissipation layer 112.

In addition, the display component 11 further includes other structures for implementing a display function, such as a transparent cover 113, a ferrite 114, a flexible printed circuit (FPC) 115, a chip on film (COF) 116, and a display controller 117. The transparent cover 113 is disposed on a light-emergent surface of the display substrate 111 (the light-emergent surface is a surface of the display substrate 111 for displaying images, and a surface opposite to the light-emergent surface is a back side of the display substrate 111) and is configured to protect the display substrate 111. The ferrite 114 is disposed on a surface, distal from the display substrate 111, of the heat dissipation layer 112 and is configured to prevent various structures of a side, distal from the display substrate 111, of the ferrite 114 from affecting the coil in the near-field communication component. The flexible printed circuit 115 is disposed on the side, distal from the display substrate 111, of the ferrite 114 and is configured to bear various circuit devices. The chip on film 116 is connected to a portion of the display substrate 111 curved to the back side and is additionally connected to the flexible printed circuit 115. The display controller 117 is disposed on the chip on film 116.

Referring to FIG. 5, the display substrate 111 includes a buffer layer 1111, an organic light-emitting diode display panel 1112, a polarizing layer and a pressure-sensitive adhesive layer 1113, and an optical adhesive 1114 that are sequentially arranged on a side, distal from the ferrite 114, of the heat dissipation layer 112. The heat dissipation layer 112 includes a grid adhesive layer 1121, foam 1122, a pressure-sensitive adhesive 1123, a substrate 1124, and a metal layer 1125 that are sequentially arranged on a side, distal from the flexible printed circuit 115, of the ferrite 114. The coil of the near-field communication component and the metal layer 1125 are of the same material and disposed in the same layer. In this way, the structure of the display device is simplified, and the manufacturing process is saved.

Exemplarily, the metal layer 1125 is made of a metal with high electrical and thermal conductivities such as copper, aluminum, iron, stainless steel, etc. The metal layer 1125 and the coil in the near-field communication component are formed by a one-time process (e.g., etching process and laser cutting process, etc.) and carried by the ferrite.

The display device further includes a mainboard. The first controller of the near-field communication component is disposed on the mainboard and is connected to the coil by the flexible printed circuit.

Figure 6:
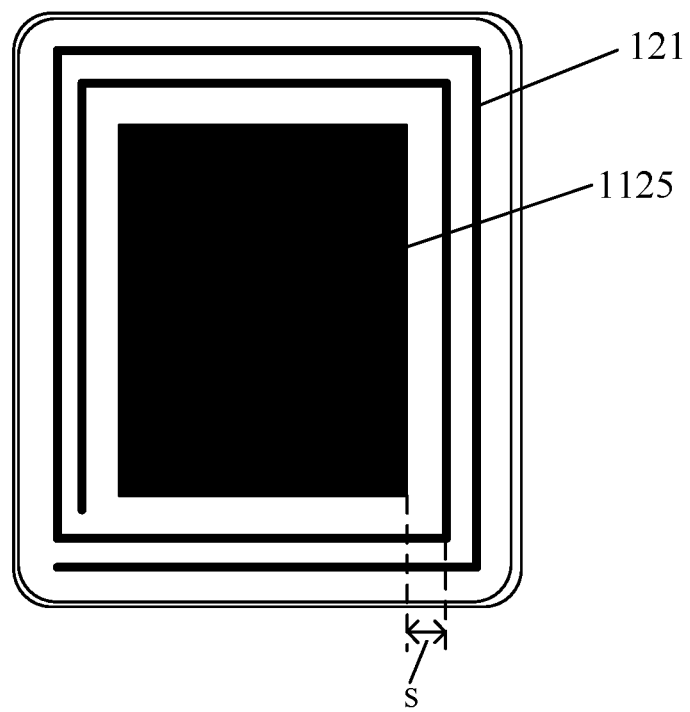
FIG. 6 is a top view of a metal layer in the display device illustrated in FIG. 4.

Referring to FIG. 6, FIG. 6 is a top view of a metal layer in the display device illustrated in FIG. 4. For ease of illustrating the structure, each structure above the metal layer is not illustrated in FIG. 6. The coil 121 in the near-field communication component 12 is arranged around the periphery of the metal layer 1125.

Optionally, the distance s between the coil 121 and the metal layer 1125 ranges from 1 mm to 50 mm. In this way, the metal layer 1125 is avoided from affecting the coil 121.

The display substrate is provided with a data line which is arranged in the display substrate to achieve the display function. In the current display devices, to avoid the coil in the near-field communication component from affecting the data line to send data, the data line and the coil are not typically overlapped in a direction perpendicular to a first surface (the first surface is a surface where the light-emergent surface of the display substrate is disposed). In this way, the size of the coil is adversely affected. However, the method according to some embodiments of the present disclosure is capable of solving the problem. An orthographic projection of the coil of the near-field communication component onto the first surface is at least partially overlapped with an orthographic projection of the data line onto the first surface. That is, the coil of the near-field communication component is arranged without deliberately avoiding the data line, such that the size of the coil can be larger, and thus a recognition distance of the near-field communication component is increased.

In the display device according to some embodiments of the present disclosure, the orthographic projection of the coil of the near-field communication component onto the first surface is not overlapped with the orthographic projection of the data line onto the first surface, which is not limited herein.

The display device further includes the control component. The near-field communication component and the display component are both electrically connected to the control component. The control component is configured to:
control the display component to operate; and
control, in response to receiving a first control instruction, at least one of the near-field communication component and the display component such that a signal-sending period of the near-field communication component falls within an image-holding period of the display component, wherein the near-field communication component is configured to send a signal during the signal-sending period.

The display device further includes the mainboard, and the control component is disposed on the mainboard.

Optionally, the control component is configured to:
send a first control signal to the near-field communication component and send a second control signal to the display component;
wherein the first control signal includes a target length of the signal-sending period, a target polling cycle, and a target position of the signal-sending period in each polling cycle, the target length being less than or equal to the length of the image-holding period of the display component operating at a target refresh cycle, the target polling cycle being an integer multiple of the target refresh cycle, and the target position being identical to a position of the image-holding period in one refresh cycle of the display component, and the second control signal instructs the display component to operate at the target refresh cycle.

For the control process of the control component, reference is made to subsequent embodiments.

Figure 7:
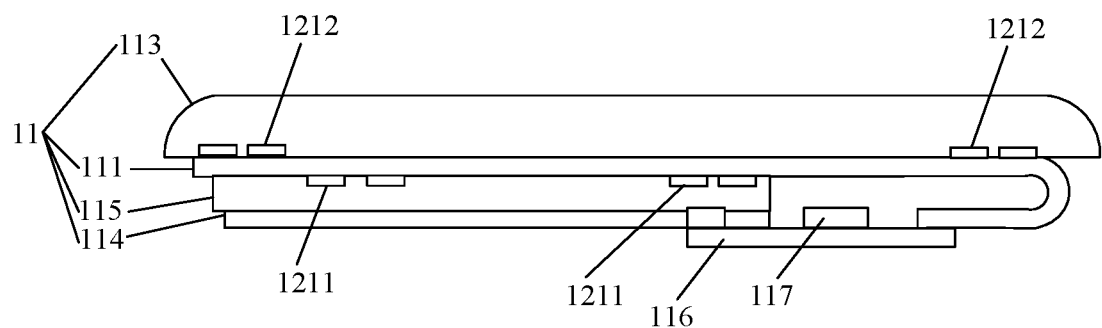
FIG. 7 is a structural schematic diagram of another display device according to some embodiments of the present disclosure.

FIG. 7 is a structural schematic diagram of another display device according to some embodiments of the present disclosure. Referring to FIG. 7, in the display device, the ferrite 114 is disposed on a side, distal from the display substrate 111, of the flexible printed circuit 115, and the coil of the near-field communication component includes a first sub-coil 1211 and a second sub-coil 1212. The first sub-coil 1211 is disposed on a side, proximal to the display substrate 111, of the flexible printed circuit 115, and the second sub-coil 1212 is disposed on the display substrate 111. In this way, the size of the coil is further enlarged, and the recognition distance of the near-field communication component is further increased.

FIG. 4 and FIG. 7 illustrate two display devices with a front-side near-field communication function. Such display devices achieve the near-field communication function on a side for displaying images. The applications of such display devices are wide and, for example, are used in applications where it is not convenient to perform near-field communication through the back side of the display device. For example, devices such as smartwatches and smart bracelets typically perform near-field communication through the front side.

However, such display devices have the problem that the near-field communication component adversely affects the normal display of the display component. The control method of the display device according to some embodiments of the present application is capable of solving the problem.

Figure 8:
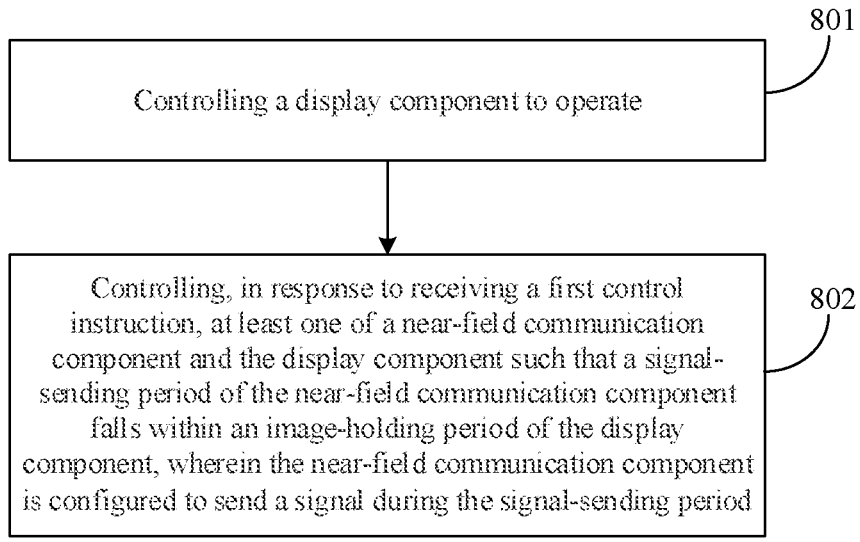
FIG. 8 is a flowchart of a control method of a display device according to some embodiments of the present disclosure.

FIG. 8 is a flowchart of a control method of a display device according to some embodiments of the present disclosure. Referring to FIG. 8, the method is applicable to a display device which is provided by the above embodiments. The method includes the following steps.

In step 801, a display component is controlled to operate; and

In step 802, in response to receiving a first control instruction, at least one of a near-field communication component and the display component is controlled such that a signal-sending period of the near-field communication component falls within an image-holding period of the display component. The near-field communication component is configured to send a signal during the signal-sending period.

In summary, a control method of a display device is provided. According to the method, at least one component of the near-field communication component and the display component is controlled during the display of the display component, such that the signal-sending period of the near-field communication component is caused to fall within the image-holding period of the display component. In this way, the signal-sending period of the near-field communication component is prevented from being overlapped with the image refresh period of the display component, which prevents the near-field communication component from affecting the image refresh of the display component when sending the signal, thereby solving the poor display effect of the display device in the related art, and improving the display effect of the display device.

Figure 9:
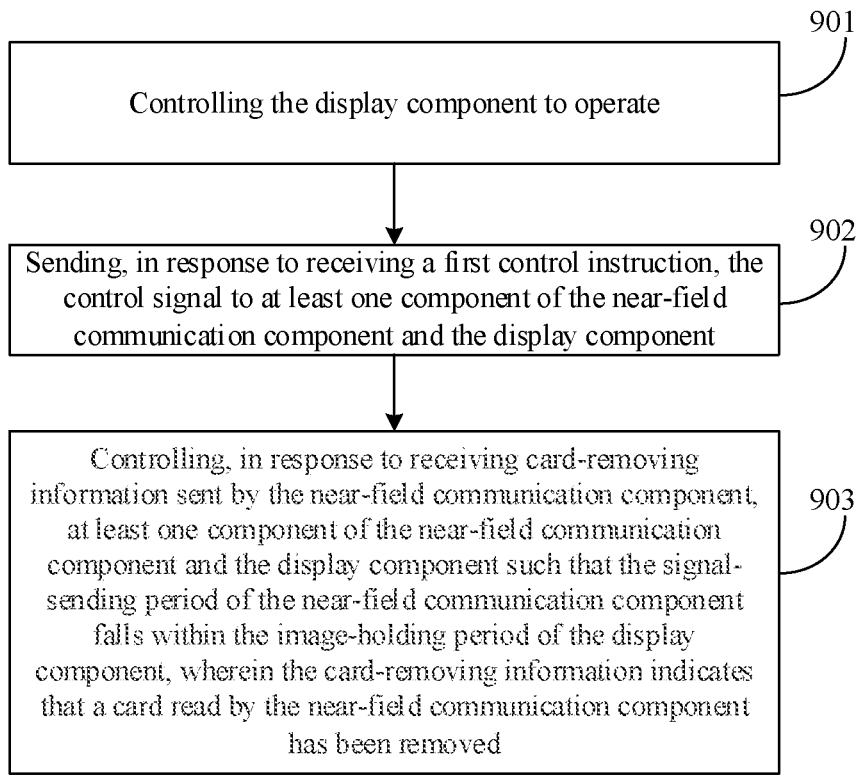
FIG. 9 is a flowchart of another control method of a display device according to some embodiments of the present disclosure.

FIG. 9 is a flowchart of another control method of a display device according to some embodiments of the present disclosure. Referring to FIG. 9, the method is applicable to a control component of a display device which is provided by the above embodiments. The method includes the following steps.

In step 901, the display component is controlled to operate.

In the method according to some embodiments of the present disclosure, the control component first controls the display component to operate. Exemplarily, the control component sends a control signal to the display component to cause the display component to operate. The display component operates at a preset refresh rate, such as 30 Hz, 60 Hz, 120 Hz, 144 Hz, etc.

In some exemplary embodiments, the control component, while controlling the display component to operate, also controls a process communication component to enter a card mode. In card mode, the near-field communication component does not affect the normal display of the display component.

In step 902, in response to receiving a first control instruction, the control signal is sent to at least one component of the near-field communication component and the display component.

The first control signal is configured to cause a polling cycle to be an integer multiple of a refresh cycle of the display component and the signal-sending period to be within the image-holding period of the display component. The polling cycle is a period during which the near-field communication component cycles into the signal-sending period and the monitoring period.

In some exemplary embodiments, the first control instruction is configured to instruct the near-field communication component to enter a card reading mode, and the near-field communication component is configured to cycle into the signal-sending period and the monitoring period in the card reading mode.

In response to receiving the first control instruction, the control component controls the near-field communication component to enter the card reading mode to cycle into the signal-sending period and the monitoring period and sends the control signal to at least one of the near-field communication component and the display component (i.e., sends the control signal to the near-field communication component, the display component, or the near-field communication component and the display component) to cause the polling cycle to be an integer multiple of the refresh cycle of the display component and one of the signal-sending periods to be within the image-holding period of the display component. In this way, each signal-sending period in each of the polling cycles is within the image-holding period of the display component.

The first control instruction is also capable of being a control instruction with other functions. For example, the first control instruction instructs the near-field communication component and the display component to be synchronized, such that the signal-sending period is within the image-holding period of the display component. In this case, the near-field communication component enters the card reading mode prior to step 902 and controls the near-field communication component and the display component to be synchronized in response to receiving the first control instruction.

In the case that the near-field communication component reads information from external cards in the card reading mode, then the near-field communication component changes an operation state to enter an information card reading mode so as to read the information of the card. In this mode, the near-field communication component stops cycling into the signal-sending period and the monitoring period.

In step 903, in response to receiving card-removing information sent by the near-field communication component, at least one component of the near-field communication component and the display component is controlled such that the signal-sending period of the near-field communication component to be within the image-holding period of the display component. The card-removing information indicates that a card read by the near-field communication component has been removed.

In the case that the near-field communication component reads the card and the card is removed (the card being removed indicates that the read external card moves out of a maximum recognition distance of the near-field communication component), the control component re-controls the near-field communication component to enter the card reading mode and controls at least one component of the near-field communication component and the display component to cause the signal-sending period of the near-field communication component to be within the image-holding period of the display component.

In steps 902 and 903, the step of controlling at least one component of the near-field communication component and the display component to cause the signal-sending period of the near-field communication component to be within the image-holding period of the display component includes three implementations. The first implementation is to achieve an effect that the signal-sending period of the near-field communication component is within the image-holding period of the display component by controlling the near-field communication component, the second implementation is to achieve the effect that the signal-sending period of the near-field communication component is within the image-holding period of the display component by controlling the display component; and the third implementation is to achieve the effect that the signal-sending period of the near-field communication component is within the image-holding period of the display component by controlling the display component and the near-field communication component. The three implementations are respectively described below.

In the first implementation, step 902 includes sending a first control signal to the near-field communication component.

The first control signal includes a target length of the signal-sending period, a target polling cycle, and a target position of the signal-sending period in each polling cycle. The target length is less than or equal to the length of the current image-holding period of the display component. The target polling cycle is the integer multiple of the current refresh cycle of the display component. The target position is identical to the position of the image-holding period in one refresh cycle of the display component.

The length of the image refresh cycle of the display component belongs to a characteristic of the display component itself, which is determined before leaving the factory. The length of the image-holding period is related with the refresh cycle or the refresh rate of the display component. In the case that the length of the refresh cycle of the display component is determined, the length of the image-holding period (i.e., the length of the image-holding period is acquired by subtracting the length of the image refresh period from the length of the refresh cycle) is also determined. For example, the longer the length of the refresh cycle of the display component, the longer the length of the image-holding period. The current refresh cycle of the display component is a value fixed at the factory, or a variable value. For example, the refresh cycle of the display component is a constant $1/60$ seconds, or varies between $1/30$ seconds, $1/60$ seconds, and $1/120$ seconds under the control of the control component. Because the refresh rate of the display component is not regulated in the first implementation, the display component is capable of operating at a higher refresh rate (e.g., 60 Hz or above).

In the first implementation, the display component is not required to be regulated (such as regulating the refresh cycle) and only the near-field communication component is regulated. For example, the length of the signal-sending period is regulated to cause the length of that to be less than or equal to the length of the image-holding period, and a position and a period of the signal-sending period are regulated to cause the signal-sending period of each polling cycle to be within the image-holding period.

It should be noted that, in some embodiments of the present disclosure, the position of the signal-sending period is configured to indicate a position of a signal-sending period in one of the polling cycles so as to cause the signal-sending period to be within an image-holding period of one of the refresh cycles (which is any refresh cycle upon the current moment, such as a refresh cycle nearest the current moment) of the display component. The position of the signal-sending period is indicated by a variety of information, such as a beginning moment, a middle moment, or an end moment of the signal-sending period. Exemplarily, in the case that the position of the signal-sending period is the beginning moment of the signal-sending period, the beginning moment and a beginning moment of the image-holding period in one of the refresh cycles of the display component are the same moments.

In the second implementation, step 902 includes: sending a second control signal to the display component.

The second control signal is configured to cause the display component to operate at a target refresh cycle, which facilitates that the signal-sending period falls within the image-holding period of the display component. The signal-sending period of the near-field communication component is generally large, and therefore the target refresh cycle is likely to be greater than a preset refresh cycle of the display component (the preset refresh cycle is a default refresh cycle of the display component, or a refresh cycle set by a user), such that the length of the image-holding period of the display component is greater than or equal to the signal-sending period. That is, this implementation reduces the refresh rate of the display component.

Exemplarily, the preset refresh cycle of the display component is $1/60$ seconds, the length of the image-holding period is the last 4/300 seconds of the $1/60$ seconds, and the length of the signal-sending period of the near-field communication component is 10/300 seconds. Then the control component increases, based on the second control signal, the length of the image-holding period to be greater than or equal to 10/300 seconds, and correspondingly increases the refresh cycle to the target refresh cycle, for example, the target refresh cycle is $1/50$ seconds.

Furthermore, the second control signal only includes the length of the signal-sending period, and the display component autonomously determines the target refresh cycle based on the length of the signal-sending period such that the length of the image-holding period is greater than or equal to the signal-sending period. In addition, in the case that the near-field communication component does not enter the card reading mode at the current moment, then the control component sends the control signal to the near-field communication component to cause the near-field communication component to enter the card reading mode.

It should be noted that since simply increasing the length of the image-holding period reduces the refresh rate of the display component and affects the display effect of the display component, the control component reduces or eliminates the effect of increasing the length of the image-holding period on the refresh rate of the display component by reducing the length of the image refresh period and increasing the length of the image-holding period.

In the display device to which the method according to some embodiments of the present disclosure is applicable, the display component includes a low temperature polycrystalline oxide (LTPO) display panel which avoids the screen flicker in the case that the frame rate is low. The display assembly also includes other types of display panels, such as a low temperature poly-silicon (LTPS) display panel and the like, which is not limited herein.

In the third implementation, step 902 includes: sending the first control signal to the near-field communication component and sending the second control signal to the display component.

The first control signal includes the target length of the signal-sending period, the target polling cycle, and the target position of the signal-sending period in each polling cycle. The target length is less than or equal to the length of the image-holding period of the display component operating at the target refresh cycle. The target polling cycle is an integer multiple of the target refresh cycle. The target position is identical to the position of the image-holding period in one refresh cycle of the display component. The second control signal instructs the display component to operate at the target refresh cycle.

In this implementation, both the display component and the near-field communication component are regulated, such that the problem of poor performance of an individual component due to excessive regulation of the individual component is avoided. For example, the problem of the poor display effect of the display component due to a significant reduction of the refresh rate of the display component is avoided.

Figure 10:
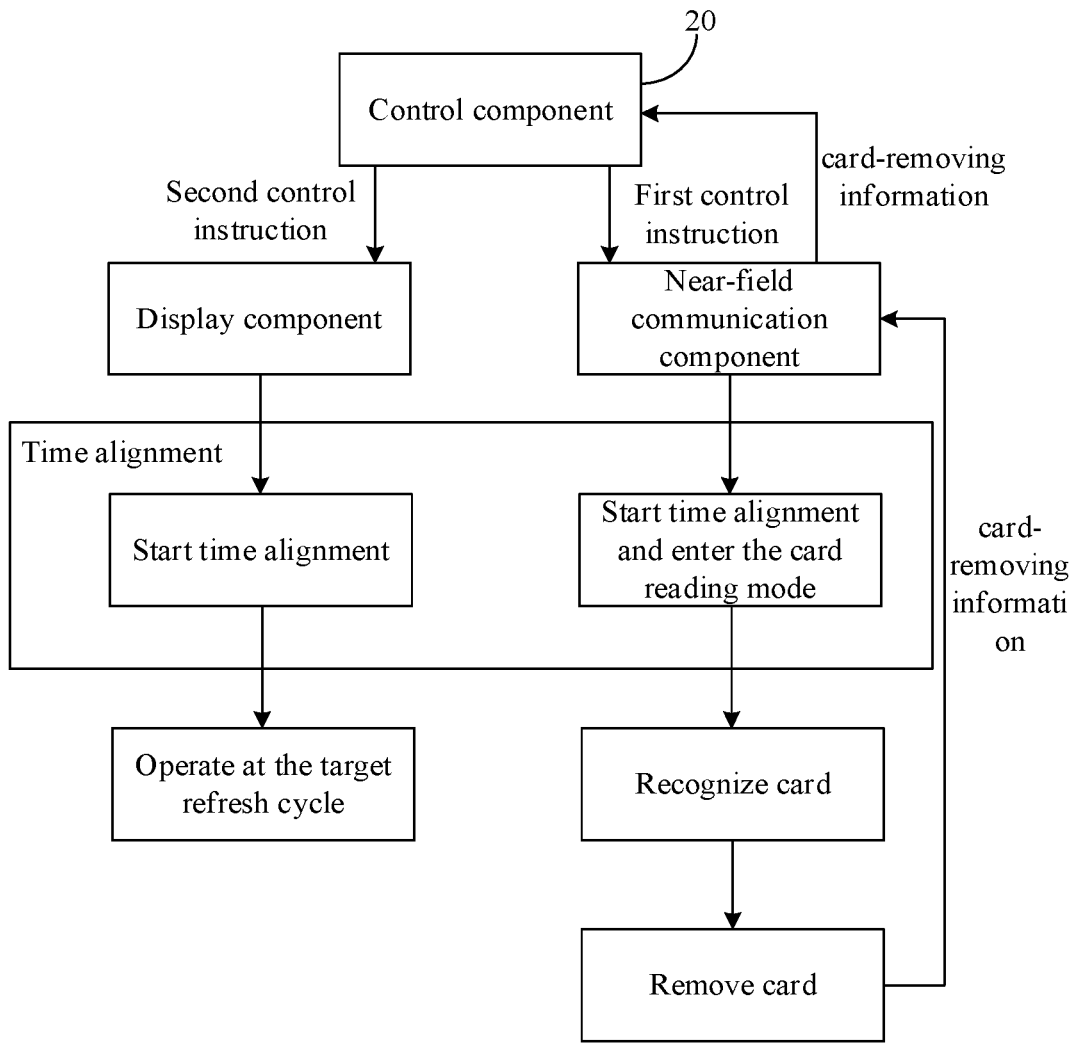
FIG. 10 is a schematic diagram of an implementation of a control method of a display device according to some embodiments of the present disclosure.

FIG. 10 is a schematic diagram of an implementation of a control method of a display device according to some embodiments of the present disclosure, and the implementation is referred to FIG. 10. The control component sends the first control instruction to the near-field communication component and sends a second control instruction to the display component. To be specific, the control component sends the first control instruction to a first controller of the near-field communication component and sends a second control instruction to a display controller of the display component.

The display component begins to perform a time alignment with the near-field communication component. The near-field communication component enters the card reading mode upon the time alignment, and the display component operates at the target refresh cycle upon the time alignment. The time alignment herein indicates that the signal-sending period of the near-field communication component is within the image-holding period of the display component. For example, the display component begins to regulate the length of the refresh cycle, and the near-field communication component beings to regulate the polling cycle.

In the case that the time alignment is completed, the display component operates at the target refresh cycle. The near-field communication component begins to read information of the card in response to recognizing the card, and the normal display of the display component is affected while reading the information of the card. However, the user experience is not affected because the reading time is short and the user does not typically view images displayed by the display component during the card reading process.

In the case that the card is removed, the near-field communication component acquires the card-removing information and sends the card-removing information to the control component. The control component re-controls the near-field communication component and the display component to perform the time alignment.

The second implementation and the third implementation described above regulate the refresh cycle of the display component, which causes the display component to operate at a lower refresh rate. To improve the display effect of the display component, for the second implementation and the third implementation described above, the control method of the display device further includes the followings.

In response to receiving the second control instruction, the near-field communication component is controlled to stop entering the signal-sending period, and the display component is controlled to operate at the first refresh cycle. The first refresh cycle is less than the target refresh cycle.

The second control instruction is configured to instruct the near-field communication component to exit the card reading mode so as to stop sending the signal. Then the display component operates at the first refresh cycle to improve the refresh rate, thereby improving the display effect. Upon exiting the card reading mode, the near-field communication component enters a card simulation mode, or the near-field communication component stops the operation.

Exemplarily, the target refresh cycle is ⅟30 seconds. In the case that the near-field communication component exits the card reading mode, the display component operates at the first refresh cycle, e.g., ⅟60 seconds, such that the refresh rate is increased from 30 Hz to 60 Hz, thereby improving the display effect greatly.

In summary, according to the second implementation and the third implementation described above, the refresh cycle of the display component is regulated to cause the display component to operate at the target refresh cycle. Because the length of the signal-sending period of the near-field communication component is typically large, the length of the image-holding period of the display component is required to be maintained at a longer length so as to cause the length of the image-holding period of the display component to be greater than or equal to the signal-sending period, which results in that the refresh cycle of the display component increases and the refresh rate of the display component correspondingly reduces, thereby reducing the display effect of the display component. Therefore, the near-field communication component is controlled to exit the card reading mode in response to receiving the second control instruction, and the display component is controlled to operate at the first refresh cycle of which the length is less than the length of the target refresh cycle, thereby increasing the refresh rate of the display component and improving the display effect.

In some exemplary embodiments, the length of the signal-sending period of the near-field communication component is 100 microseconds; the refresh cycle of the display component is 16.67 milliseconds; and the length of the monitoring period of the near-field communication component ranges from 300 milliseconds to 500 milliseconds. Then the control component begins to perform the time alignment to cause the length of the signal-sending period of the near-field communication component to be less than or equal to the image-holding period of the display component and regulates the signal-sending period T1 and the monitoring period T2 of the near-field communication component to cause (T1+T2)/16.67 to be an integer. In this way, each of the signal-sending periods T1 is ensured to fall into the image-holding period.

Figure 11:
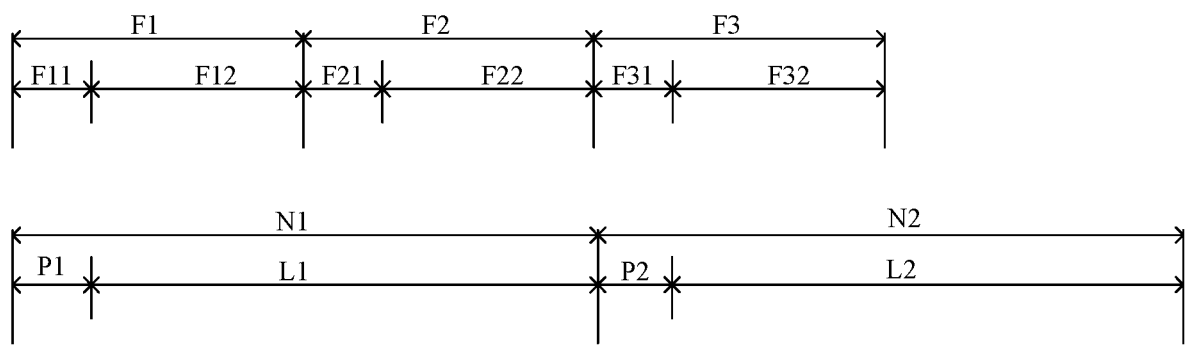
FIG. 11 is a schematic diagram of an operation of a display component and a near-field communication component upon alignment according to some embodiments of the present disclosure.

FIG. 11 is a schematic diagram of an operation of a display component and a near-field communication component upon alignment according to some embodiments of the present disclosure. Referring to FIG. 11, the length of the polling cycle N1 of the near-field communication component is twice the length of the refresh cycle F1 of the display component, and in each of the polling cycles, the signal-sending period is consistent with the image-holding period (e.g., F11 is consistent with P1).

In summary, a control method of a display device is provided. According to the method, at least one component of the near-field communication component and the display component is controlled during the display of the display component, such that the signal-sending period of the near-field communication component is caused to fall within the image-holding period of the display component. In this way, the signal-sending period of the near-field communication component is prevented from being overlapped with the image refresh period of the display component, which prevents the near-field communication component from affecting the image refresh of the display component when sending the signal, thereby solving the poor display effect of the display device in the related art, and improving the display effect of the display device.

Some embodiments of the present disclosure further provide a control component of a display device, and the control component is applicable to the display device including a near-field communication component and a display component. The control component of the display device includes:
 a first control module, configured to control the display component to operate; and
 a second control module, configured to control, in response to receiving a first control instruction, at least one of the near-field communication component and the display component such that a signal-sending period of the near-field communication component falls within an image-holding period of the display component, wherein the near-field communication component is configured to send a signal during the signal-sending period.

In summary, some embodiments of the present disclosure provide a control component of a display device. According to the control component, at least one component of the near-field communication component and the display component is controlled during the display of the display component, such that the signal-sending period of the near-field communication component is caused to fall within the image-holding period of the display component. In this way, the signal-sending period of the near-field communication component is prevented from being overlapped with the image refresh period of the display component, which prevents the near-field communication component from affecting the image refresh of the display component when sending the signal, thereby solving the poor display effect of the display device in the related art, and improving the display effect of the display device.

According to another aspect of the present disclosure, a display device is provided. The display device includes a processor and a memory storing at least one instruction, at least one program, a code set, or an instruction set therein. The processor, when loading and executing the at least one instruction, the at least one program, the code set, or the instruction set, is caused to perform the control method of the display device as described above.

According to still another aspect of the present disclosure, a non-transitory computer storage medium is provided. The non-transitory computer storage medium stores at least one instruction, at least one program, a code set, or an instruction set therein. The at least one instruction, the at least one program, the code set, or the instruction set, when loaded and executed by a processor, causes the processor to perform the control method of the display device as described above.

According to still another aspect of the present disclosure, a computer program product or a computer program is provided. The computer program product or the computer program includes one or more computer instructions stored in a computer-readable storage medium. The one or more computer instructions, when loaded and executed by a processor of a computer device from the computer-readable storage medium, cause the computer device to perform the control method of the display device as described above.

In the present disclosure, the term "at least one of A and B" merely indicates three relationships between contextual objects. For example, at least one of A and B means that A exists alone, A and B exist at the same time, and B exists alone. Similarly, "at least one of A, B and C" means that seven relationships exist. A exists alone, B exists alone, C exists alone, A and B exist at the same time, A and C exist at the same time, C and B exist at the same time, and A, B and C exist at the same time. Similarly, "at least one of A, B, C and D" means that fifteen relationships exist: A exists alone, B exists alone, C exists alone, D exists alone. A and B exist at the same time. A and C exist at the same time. A and D exist at the same time, C and B exist at the same time, D and B exist at the same time, C and D exist at the same time, A, B and C exist at the same time, A, B and D exist at the same time, A, C and D exist at the same time, B, C and D exist at the same time, and A, B. C and D exist at the same time.

It should be pointed out that in the accompanying drawings, the sizes of layers and regions may be exaggerated for clearer illustration. It should be understood that in the case that an element or layer is referred to as being "on" another element or layer, it may be directly on another element, or intervening layers may be present. In addition, it should be understood that in the case that an element or layer is referred to as being "under" another element or layer, the layer may be directly under the other element, or there may be more than one intervening layer or element. In addition, it can further be understood that in the case that a layer or element is referred to as being "between" two layers or two elements, the layer may be the only layer between the two layers or two elements, or more than one intervening layer or element may also be present. Similar reference numerals indicate similar elements throughout.

In the present disclosure, the terms "first" and "second" are only used for descriptive purposes, and cannot be understood as indicating or implying relative importance. The term "a plurality of" refers to two or more, unless expressly defined otherwise.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A display device, comprising a control component, a near-field communication component, and a display component, wherein the near-field communication component and the display component are both electrically connected to the control component, and the control component is configured to:
   control the display component to operate; and
   control, in response to receiving a first control instruction, at least one of the near-field communication component and the display component such that a signal-sending period of the near-field communication component falls within an image-holding period of the display component, wherein the near-field communication component is configured to send a signal during the signal-sending period;
   the control component is configured to:
   send a first control signal to the near-field communication component and send a second control signal to the display component;
   wherein the first control signal comprises a target length of the signal-sending period a target polling cycle, and a target position of the signal-sending period in each polling cycle, the target length being less than or equal to a length of the image-holding period of the display component operating at a target refresh cycle, the target polling cycle being an integer multiple of the target refresh cycle, and the target position being identical to a position of the image-holding period in one refresh cycle of the display component, and the second control signal instructs the display component to operate at the target refresh cycle.

2. The display device according to claim 1, wherein the display component comprises a display substrate and a heat dissipation layer disposed on a back of the display substrate; and
   the near-field communication component comprises a first controller and a coil, the first controller being electrically connected to the coil and the coil being disposed in the heat dissipation layer.

3. The display device according to claim 2, wherein the heat dissipation layer comprises a substrate and a metal layer disposed on the substrate, and the coil of the near-field communication component and the metal layer are of a same layer structure and disposed in a same layer.

4. The display device according to claim 3, wherein a distance between the coil and the metal layer ranges from 1 mm to 50 mm.

5. The display device according to claim 1, wherein the display component comprises a display substrate provided with a data line; and the near-field communication component comprises a first controller and a coil, wherein the first controller is electrically connected to the coil, and an orthographic projection of the coil onto a first surface is at least partially overlapped with an orthographic projection of the data line onto the first surface, the first surface being a surface where a light-emergent surface of the display substrate is disposed.

6. A control method of a display device, applicable to the display device comprising a near-field communication component and a display component, wherein the method comprises:

controlling the display component to operate; and controlling, in response to receiving a first control instruction, at least one of the near-field communication component and the display component such that a signal-sending period of the near-field communication component falls within an image-holding period of the display component, wherein the near-field communication component is configured to send a signal during the signal-sending period;

the near-field communication component is configured to cycle into the signal-sending period and a monitoring period; and the controlling, in response to receiving the first control instruction, at least one of the near-field communication component and the display component such that the signal-sending period of the near-field communication component falls within the image-holding period of the display component comprises:

sending, in response to receiving the first control instruction, a control signal to the at least one of the near-field communication component and the display component such that a polling cycle is an integer multiple of a refresh cycle of the display component and the signal-sending period falls within the image-holding period of the display component, wherein the polling cycle is a period during which the near-field communication component cycles into the signal-sending period and the monitoring period.

7. The control method according to claim 6, wherein sending the control signal to the at least one of the near-field communication component and the display component comprises:

sending a first control signal to the near-field communication component, wherein the first control signal comprises a target length of the signal-sending period, a target polling cycle, and a target position of the signal-sending period in each polling cycle, the target length being less than or equal to a length of a current image-holding period of the display component, the target polling cycle being an integer multiple of a current refresh cycle of the display component, and the target position being identical to a position of the image-holding period in one refresh cycle of the display component.

8. The control method according to claim 7, wherein the first control instruction instructs the near-field communication component to enter a card reading mode, and the near-field communication component is configured to cycle into the signal-sending period and the monitoring period in the card reading mode.

9. The control method according to claim 6, wherein sending the control signal to the at least one of the near-field communication component and the display component comprises:

sending a second control signal to the display component, wherein the second control signal instructs the display component to operate at a target refresh cycle such that the signal-sending period falls within the image-holding period of the display component.

10. The control method according to claim 9, further comprising:

controlling, in response to receiving the second control instruction, the near-field communication component to stop entering the signal-sending period, and controlling the display component to operate at a first refresh cycle, wherein the first refresh cycle is less than the target refresh cycle.

11. The control method according to claim 10, wherein upon controlling, in response to receiving the first control instruction, at least one of the near-field communication component and the display component such that the signal-sending period of the near-field communication component falls within the image-holding period of the display component, the method further comprises:

controlling, in response to receiving card-removing information sent by the near-field communication component, the least one of the near-field communication component and the display component such that the signal-sending period of the near-field communication component falls within the image-holding period of the display component, wherein the card-removing information indicates that a card read by the near-field communication component has been removed.

12. The control method according to claim 6, wherein sending the control signal to the at least one of the near-field communication component and the display component comprises:

sending a first control signal to the near-field communication component and sending a second control signal to the display component;

wherein the first control signal comprises a target length of the signal-sending period, a target polling cycle, and a target position of the signal-sending period in each polling cycle, the target length being less than or equal to a length of the image-holding period of the display component operating at a target refresh cycle, the target polling cycle being an integer multiple of the target refresh cycle, and the target position being identical to a position of the image-holding period in one refresh cycle of the display component, and the second control signal instructs the display component to operate at the target refresh cycle.

13. A non-transitory computer storage medium storing at least one instruction, at least one program, a code set, or an instruction set therein, wherein the at least one instruction, the at least one program, the code set, or the instruction set, when loaded and executed by a processor, causes the processor to perform the control method of the display device as defined in claim 6.

14. A display device, comprising a processor and a memory storing at least one instruction, at least one program, a code set, or an instruction set therein, wherein the processor, when loading and executing the at least one instruction, the at least one program, the code set, or the instruction set, is caused to perform:

controlling the display component to operate; and controlling, in response to receiving a first control instruction, at least one of the near-field communication component and the display component such that a signal-sending period of the near-field communication component falls within an image-holding period of the display component, wherein the near-field communication component is configured to send a signal during the signal-sending period;

wherein the near-field communication component is configured to cycle into the signal-sending period and a monitoring period, and the processor, when loading and executing the at least one instruction, the at least one program, the code set, or the instruction set, is caused to perform:

sending, in response to receiving the first control instruction, a control signal to the at least one of the near-field communication component and the display component such that a polling cycle is an integer multiple of a refresh cycle of the display component and the signal-sending period falls within the image-holding period of the display component, wherein the polling cycle is a period during which the near-field communication component cycles into the signal-sending period and the monitoring period.

15. The display device according to claim 14, wherein the at least one instruction, the at least one program, the code set, or the instruction set, when loaded and executed by the processor, causes the processor to perform:

sending a first control signal to the near-field communication component, wherein the first control signal comprises a target length of the signal-sending period, a target polling cycle, and a target position of the signal-sending period in each polling cycle, the target length being less than or equal to a length of a current image-holding period of the display component, the target polling cycle being an integer multiple of a current refresh cycle of the display component, and the target position being identical to a position of the image-holding period in one refresh cycle of the display component.

16. The display device according to claim 14, wherein the at least one instruction, the at least one program, the code set, or the instruction set, when loaded and executed by the processor, causes the processor to perform:

sending a second control signal to the display component, wherein the second control signal instructs the display component to operate at a target refresh cycle such that the signal-sending period falls within the image-holding period of the display component.

17. The display device according to claim 14, wherein the at least one instruction, the at least one program, the code set, or the instruction set, when loaded and executed by the processor, causes the processor to perform:

sending a first control signal to the near-field communication component and sending a second control signal to the display component;

wherein the first control signal comprises a target length of the signal-sending period, a target polling cycle, and a target position of the signal-sending period in each polling cycle, the target length being less than or equal to a length of the image-holding period of the display component operating at a target refresh cycle, the target polling cycle being an integer multiple of the target refresh cycle, and the target position being identical to a position of the image-holding period in one refresh cycle of the display component, and the second control signal instructs the display component to operate at the target refresh cycle.

* * * * *